(12) United States Patent
Tomita et al.

(10) Patent No.: US 6,449,607 B1
(45) Date of Patent: Sep. 10, 2002

(54) DISK STORAGE WITH MODIFIABLE DATA MANAGEMENT FUNCTION

(75) Inventors: Aki Tomita, Tachikawa; Yoshifumi Takamoto, Kokubunji, both of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/393,327

(22) Filed: Sep. 10, 1999

(30) Foreign Application Priority Data

Sep. 11, 1998 (JP) .......................................... 10-257822

(51) Int. Cl.[7] .............................................. G06F 17/30
(52) U.S. Cl. .............................. 707/3; 707/1; 707/101; 707/205
(58) Field of Search ........................... 707/1, 2, 3, 101, 707/205; 711/113, 114; 712/28; 714/20, 6

(56) References Cited

U.S. PATENT DOCUMENTS

| | | | |
|---|---|---|---|
| 5,574,952 A | * 11/1996 | Brady et al. ................... | 341/95 |
| 5,727,232 A | * 3/1998 | Iida et al. ...................... | 710/56 |
| 5,745,749 A | * 4/1998 | Onodera ...................... | 707/100 |
| 5,787,493 A | * 7/1998 | Niijima et al. ............... | 711/152 |

OTHER PUBLICATIONS

"A Cost–Effective, High–Bandwidth Storage Architecture", Proceedings of the 8th ASPLOS Conference, 1998, pp. 92–103.
"Active Storage for Large–Scale DAta Mining and Multimedia", Proceeding of the 24th VLDB Conference, New York, 1998, pp. 62–73.
"Active Disks: Programming Model, Algorithsm and Evaluation", Proceedings of the 8th ASPLOS Conference, 1998, pp. 81–91.

* cited by examiner

Primary Examiner—Jean M. Corrielus
(74) Attorney, Agent, or Firm—Mattingly, Stanger & Malur, P.C.

(57) ABSTRACT

A disk storage device comprising; a disk controller for accessing a disk storage medium to read/write data thereon, an object management program for converting a control command containing an object identifier received through a network interface into a control command containing physical address information of the disk storage medium and for feeding the thus converted control command to the disk controller, an object management modification program for modifying a function of the object management program in response to a modification request message received through the network interface, and a processor for carrying out these programs.

10 Claims, 11 Drawing Sheets

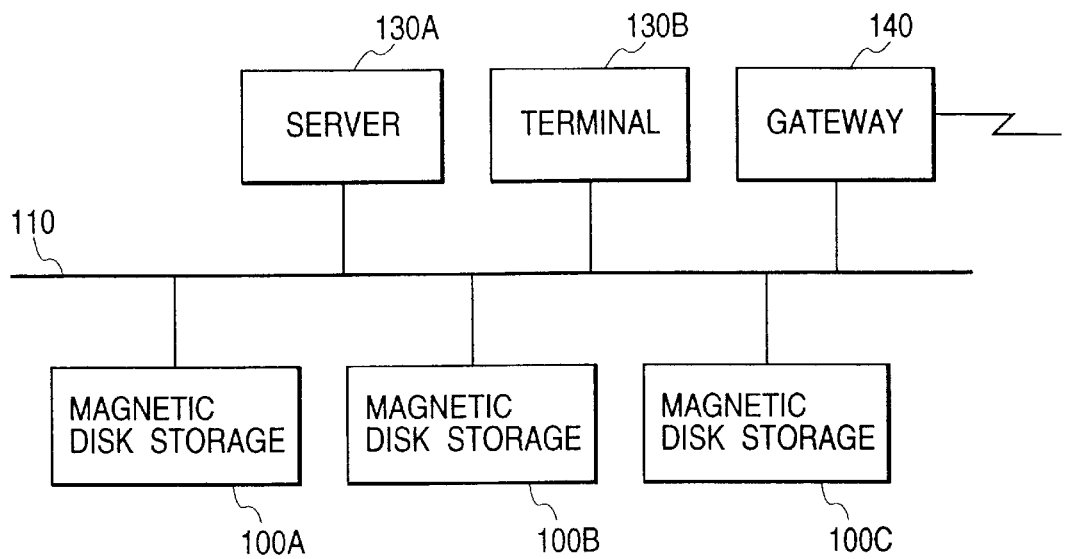
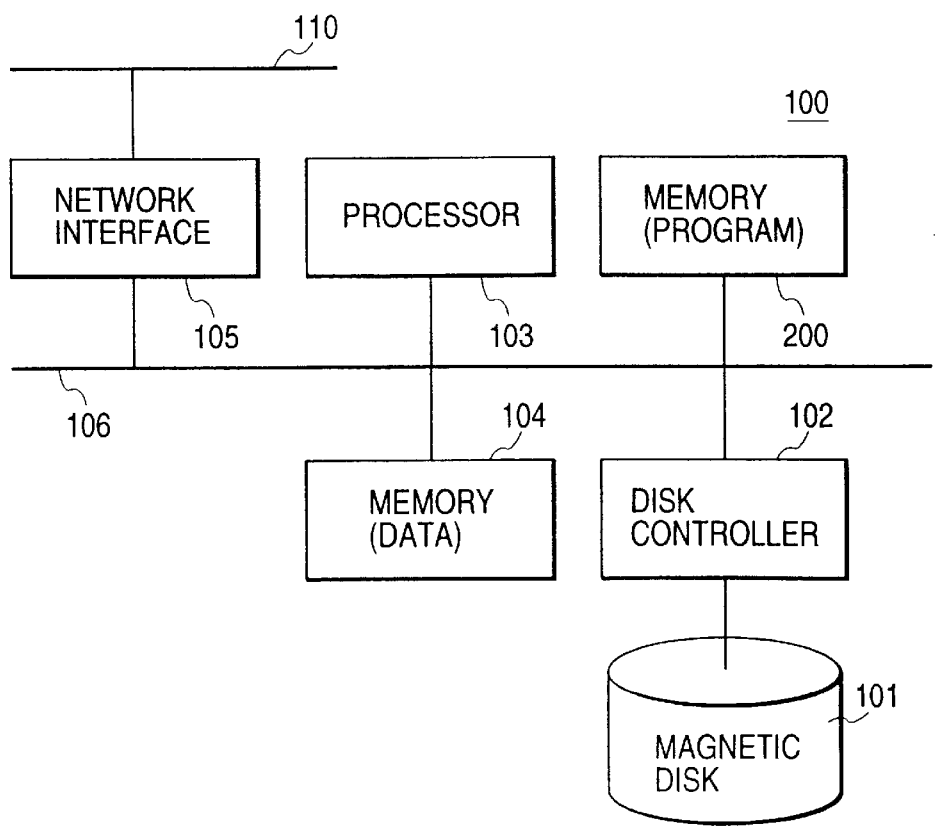

| PARTITION ID | DRIVE ID | STORAGE AREA |
|---|---|---|
| 333A | 333B | 333C |

| AVAILABLE VALUES OF PARAMETER | PARTITION ID | CURRENT VALUES OF PARAMETER |
|---|---|---|
| 1 : TREE<br>2 : DISTRIBUTED TREE<br>3 : INDEXING<br>4 : DISTRIBUTED INDEXING | /HOME | 1 |
| | /IMAGE | 3 |
| | ⋮ | ⋮ |
| 334A | 334B | 334C |

FIG. 9

335-2 PARTITION ID: /IMAGE
335-1 PARTITION ID: /HOME

| PARAMETERS | | AVAILABLE VALUES | CURRENT VALUE |
|---|---|---|---|
| P10 | BUFFER SIZE | FIXED(4,8,··· KB)<br>V : VARIABLE | 4 |
| P11 | UPDATE CYCLE OF STORAGE | 3 : THREE SEC.<br>5 : FIVE SEC.<br>⋮<br>E : EVERY WRITE OPERATION | E |
| ⋮ | ⋮ | ⋮ | ⋮ |
| 335A | 335B | 335C | 335D |

FIG. 10

| | PARAMETERS | AVEILABLE VALUES | CURRENT VALUE |
|---|---|---|---|
| P21 | DESIGNATION OF COMPONENT PROGRAM | 1 : FIXED<br>2 : EVERY R/W OPERATION | 1 |
| P22 | COMPONENT PROGRAM | 1 : XML TRANSFORMATION<br>2 : FILTERING<br>3 : ENCIPHER<br>4 : COMPRESSION<br>5 : PRIVATE | 3 |
| P23 | TIMING OF EXECUTION | 1 : EVERY READ/WRITE<br>2 : SPECIFIED TIME<br>3 : | 1 |

PARTITION ID: / IMAGE (336-2)
PARTITION ID: / HOME (336-1)

336A, 336B, 336C, 336D

DISK STORAGE WITH MODIFIABLE DATA MANAGEMENT FUNCTION

BACKGROUND OF THE INVENTION (1) Field of the Invention

The present invention relates to a disk storage device, and more particularly to a disk storage device having a modifiable data management function.

(2) Description of the Related Art

Conventionally, a magnetic disk storage device is provided with just simple functional features, such as a function for managing data on a fixed-block-size basis, due to limitations in hardware configuration.

In the SCSI (Small Computer System Interface) scheme which was developed by the ANSI (American National Standard Institute) and has been in widespread use for interfacing between a magnetic disk storage device and a computer, data input/output is carried out in units of blocks (sectors) each having a physically predetermined size, not in data structural units corresponding to logical data aggregates such as files or tables. Since the SCSI is applicable just to a relatively low level of interfacing, it is required to provide a file system or a database management system to be carried out on a host computer (or disk server) directly connected with the conventional magnetic disk storage device in the case of implementation of high-level interfacing capable of transferring logical data blocks such as files or tables, for example. Further, since the conventional magnetic disk storage device is not provided with an interface mechanism for direct connection to a communication network, intervention of the host computer directly connected with the magnetic disk storage device is required for an application program running on another computer to input data to a remote magnetic disk storage device or to output data therefrom.

In the background of rapid advances in hardware technologies and trends toward lower cost of hardware, an NASD (Network-Attached Secure Disk) has recently been proposed by G. Gibson of Carnegie-Mellon University (Proceedings of the 8th ASPLOS Conference, 1998), which is a magnetic disk storage device having a communication network connection interface mechanism that enables direct input/output of magnetic disk data through a remote computer without intervention of a host computer. In addition to the network connection interface mechanism, the NASD is also provided with a function for managing stored data so as to enable accessing each logical aggregate structure of data such as a file, for example.

Examined hereinbelow is the technique of OLAP (Online Analytical Processing) for data mining and decision-making system applications that are expected to proliferate in the near future. In OLAP for market trend forecasting, for example, business data querying processing is carried out frequently to find out any data meeting a certain condition among a large amount of data. In a conventional data query system, all the business data under search examination are read out sequentially from magnetic disk storage, and a computer makes a judgment whether or not each data meets a specified search condition to find out desired data. Therefore, most data not meeting the specified search condition are transferred to the computer uselessly in consequence. In this situation, if only the data meeting the specified search condition can be transferred to the computer by feeding the specified search condition to the magnetic disk storage, the amount of data transferred from the magnetic disk storage to the computer is decreased significantly to enable substantial reduction in work load on the computer.

It is possible to speed up data analysis and image processing by providing magnetic disk storage with functions for supporting OLAP and image processing, which has been suggested in evaluation experiments conducted at Carnegie-Mellon University (Proceedings of the 24th VLDB Conference, 1998) and University of California—Santa Barbara (Proceedings of the 8th ASPLOS Conference, 1998).

The above-noted NASD has been proposed since it has become costwise feasible to incorporate a hardware function for processing data in units of logical data into magnetic disk storage thanks to rapid advances in hardware technologies accompanied with substantial reduction in cost of hardware. As expected at present, further progress in hardware technologies will still reduce hardware cost, making it possible to provide magnetic disk storage with more advanced functions.

However, merely fixed functionality is provided in the NASD. For example, in the NASD, it is not allowed to discretionarily add any function (object management function) for managing stored data in access units of logical data structures such as directories or folders (hereinafter referred to as objects) or to arbitrarily modify an object management function in part. Further, while the performance of the conventional magnetic disk storage device can be improved substantially using a data caching function, the NASD does not allow a user to modify any data management attribute concerning the data caching function, for example, or to add such an extended function as an OLAP support function.

SUMMARY OF THE INVENTION

It is therefore an object of the present invention to provide a disk storage device having a modifiable object management function.

Another object of the present invention is to provide a disk storage device which allows a user to specify and modify file organization, object management attributes, and extended functionality.

In accomplishing these objects of the present invention and according to one aspect thereof, there is provided a disk storage device comprising: a disk storage medium; a network interface; a disk controller having an object management function in which a high-level read/write command specified for an access target using an object identifier received through the network interface is converted into a low-level read/write command containing physical address information of the disk storage medium for making access to the disk storage medium; and object management modification means for modifying the object management function in response to a modification request message received through the network interface.

According to another aspect of the present invention, there is provided a disk storage device comprising: a disk storage medium, a disk controller for accessing the disk storage medium to read/write data thereon; an interface for connecting the disk storage device to a network; object management means for converting a control command containing an object identifier received through the interface into a control command containing physical address information of the disk storage medium and for feeding the thus converted control command to the disk controller; and object management modification means for modifying a function of the object management means in response to a modification request message received through the interface.

More particularly, according to the present invention, the modification request message contains at least one of parameters concerning file organization, data management attributes and data processing in correspondence with each partition identifier, and the object management modification means modifies at least one of functions concerning file organization, data management attributes and data processing, which are provided in the object management means, according to the parameter contained in the modification request message.

BRIEF DESCRIPTION OF THE DRAWINGS

FIG. 1 is a diagram showing an embodiment of a computer network including a disk storage device according to the present invention;

FIG. 2 is a block diagram showing an embodiment of a hardware configuration of the disk storage device according to the present invention;

FIG. 7 is a diagram showing details of a partition configuration field 333 in the management table 330;

FIG. 8 is a diagram showing details of an object organization parameter field 334 in the management table 330;

FIG. 9 is a diagram showing details of an object management attribute parameter field 335 in the management table 330;

FIG. 10 is a diagram showing details of an "extended function of object management" parameter field 336 in the management table 330;

DESCRIPTION OF THE PREFERRED EMBODIMENTS

Figure 3:
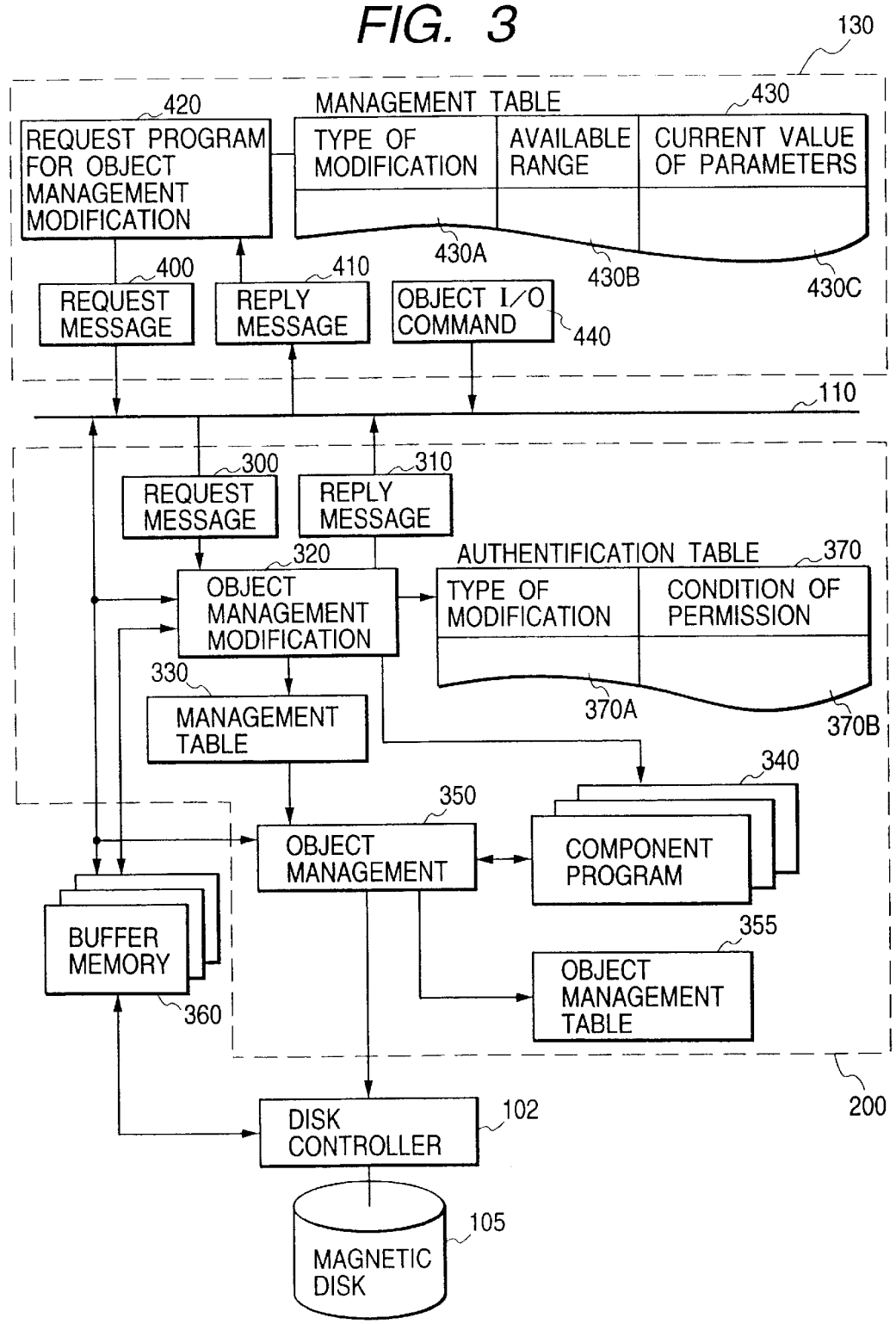
FIG. 3 is a diagram showing a software configuration arranged for disk storage device 100 and terminal device 130 according to the present invention.

Referring to FIG. 1, there is shown an embodiment of a computer network which is so configured as to include a disk storage device according to the present invention.

The computer network comprises magnetic disk storage devices 100 (100A, 100B, 100C) each containing a plurality of objects corresponding to logical data structural units such as files, tables and records, computers including servers 130A and terminals 130B which act as requesters for object management modification, and a network 110 for connecting these disk storage devices and computers. The network 100 is connected with another computer network or communication network through a gateway 140, for example.

In this exemplary computer network, an object management modification requester 130 is typically a server computer, a client terminal computer, a host computer, or an application program to be run thereon. In a special case, a magnetic disk storage device or the like storage device where an application program is stored may also act as one of the object management modification requesters 130.

Referring to FIG. 2, there is shown a preferred embodiment of a hardware configuration of the magnetic disk storage device 100.

The magnetic disk storage device 100 in accordance with the present invention comprises, a magnetic disk 101, a disk controller 102 which accesses the magnetic disk 101 for reading/writing data thereon, a processor 103, a memory 200 for storing such programs as an object management program 350 and an object management modification program 320 to be described later, a data memory 104 for providing a buffer memory area where data to be read/written is buffered and for forming a variety of tables, a network interface 105 for connection with the network 110, and an internal bus 106.

The processor 103 carries out the object management program 350, whereby a high-level file control command given by a user through the network 110 and the network interface 105 is converted into a low-level control command that is acceptable by the disk controller 102, e.g., a SCSI-defined low-level control command. Further, in response to an object management modification request given by the user through the network 110 and the network interface 105, the processor 103 carries out the object management modification program 320 to modify a function of the object management program 350.

While the processor 103 arranged separately from the disk controller 102 is used to carry out the object management program 350 and the object management modification program 320 in the present embodiment, there may also be provided such an arrangement that these programs are carried out by a processor incorporated in the disk controller 102.

Referring to FIG. 3, there is shown a software configuration arranged for the object management modification requester 130 and the magnetic disk storage device 100.

The object management modification requester 130 is provided with a request program 420 for object management modification which issues a request message 400 for object management modification to the magnetic disk storage device 100 and which receives a reply message 410 from the magnetic disk storage device, and the object management modification requester 130 is also provided with a management table 430 which is updated according to the reply message 410. An object I/O command 440 for reading/writing data on the magnetic disk 101 is issued by another application program for use on an ordinary computer, not by the request program 420 mentioned above.

In the program memory 200 of the magnetic disk storage device 100, there are contained an object management program 350, an object management modification program 320 which modifies a function of the object management program 350 according to a request message 300 (equivalent to the request message 400) received through the network 110 and which outputs a reply message 310 for indicating the results of modification, a management table 330, a variety of component programs 340 used by the object management program 350, an object management table 355 used by the object management program 350, and an authentication table 370 which is referenced by the object management modification program 320. Reference numeral 360 in FIG. 3 indicates a buffer memory which is provided on the data memory 104 for temporarily storing data to be read/written.

The object management modification program 320 and the object management program 350 are stored on the magnetic disk 101. When power to the magnetic disk storage device 100 is turned on, these programs are automatically loaded from the magnetic disk 101 to the program memory 200 for execution.

To the magnetic disk storage device 100, the object management modification requester 130 issues the request message indicating a request for modifying (or initially setting up) a parameter concerning object organization (file organization), data management attributes or object management extended functionality.

In the present embodiment, a data management attribute represents, for example, a buffer size for temporarily storing data to be read/written on the magnetic disk, or a specifier for determining whether the buffer size is to be invariable or variable. In object management functional extension, any special function other than an ordinary data read/write function may be added, for example, a function for detecting an edge of an image in image data read out of the magnetic disk prior to transmission to the requester, a function for eliminating noise from image data, or a function for selection in OLAP may be added.

Figure 4:
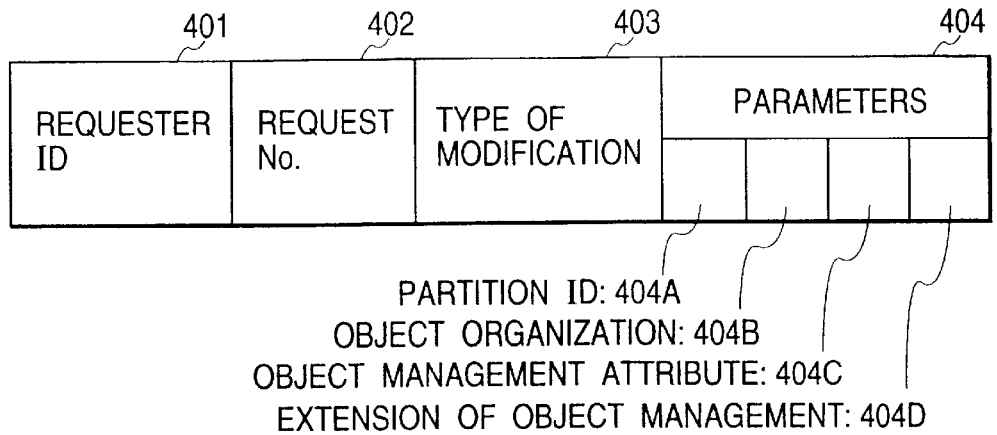
FIG. 4 is a diagram showing a format for a modification request message 400 to be issued from the terminal device to the disk storage device.

Referring to FIG. 4, there is shown a format for the request message 400.

The request message 400 comprises a requester ID 401 for identifying a source of request (object management modification requester), a request number 402, a type-of-modification code 403, and a parameter field 404 for indicating requested items.

The requester ID 401, for example, contains a combination of an IP address and a port number; the IP address indicates a location of a computer on which a requester application program is run, and the port number indicates a port used by the requester application program. The parameter field 404 contains a field 404A for indicating a partition ID defined for a storage area on the magnetic disk 101, a field 404B for indicating object organization, a field 404C for indicating an object management attribute, and a field 404D for indicating extension of object management functionality.

Figure 5:
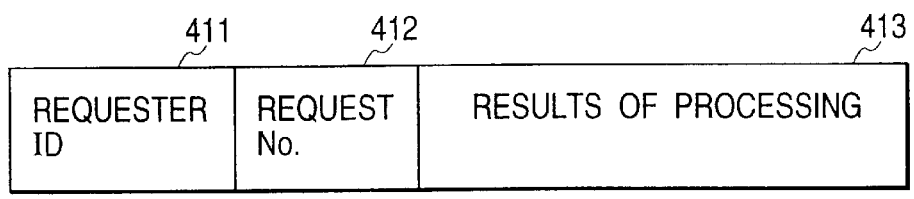
FIG. 5 is a diagram showing a format for a reply message 410 to be sent from the disk storage device to the terminal device.

Referring to FIG. 5, there. is shown a format for the reply message 410 for indicating the results of processing by the object management modification program 320. The reply message 310 has the same format as that of the reply message 410. The reply message 410 contains a requester ID 411, a request number 412, and information on the results of processing 413.

Figure 6:
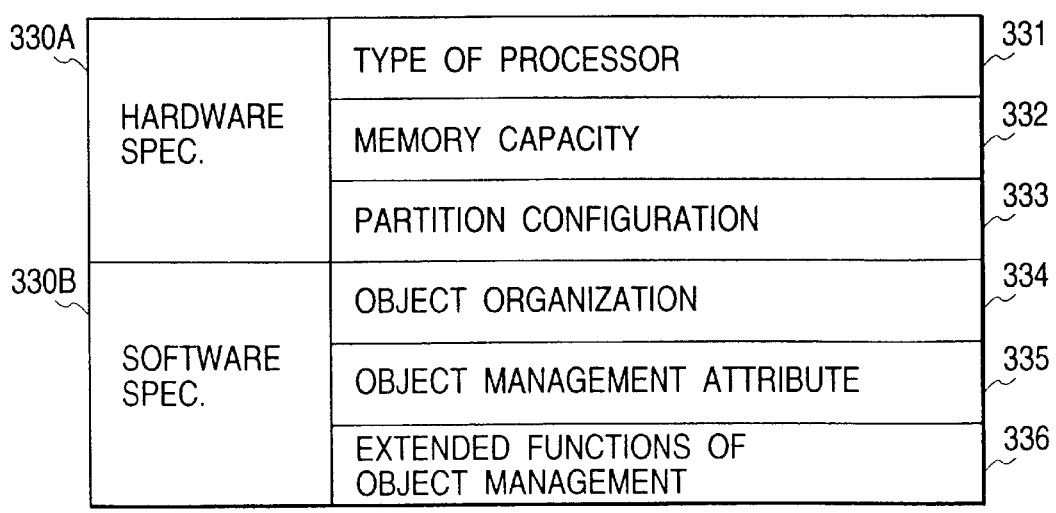
FIG. 6 is a diagram showing a format for a management table 330 provided in the disk storage device.

Referring to FIG. 6, there is shown a structure of the management table 330 used for defining operations of the object management program 350. The management table 330 comprises a hardware specification table 330A and a software specification table 330B, and the contents thereof are modified by the object management modification program 320.

The hardware specification table 330A, for example, contains a field 331 for indicating a type code of the processor 103, a field 332 for indicating a capacity of the memory 200 incorporated in the magnetic disk storage device 100, and a field 333 for indicating a partition configuration of the magnetic disk medium 101. These fields are provided to indicate useful reference information for selection in object management modification.

The software specification table 330B contains a parameter table 334 concerning object organization, a parameter table 335 concerning object management attributes, and a parameter table 336 concerning extended functions of object management.

Referring to FIG. 7, there are shown details of the partition configuration field 333. In this field, a drive device ID 333B and a storage area 333C are defined in correspondence with a partition ID 333A.

Referring to FIG. 8, there are shown details of the object organization parameter table 334.

In the object organization parameter table 334, available parameter items 334A are contained beforehand. Each current parameter value 334C is indicated in correspondence with a partition ID 334B. The available parameter items 334A, for example, include the following; tree structure method, distributed tree structure method, indexing method, distributed indexing method, unused state, user-specified method, etc.

Referring to FIG. 9, there are shown details of the object management attribute parameter table 335.

The object management attribute parameter table 335 comprises a plurality of subtables 335-1, 335-2, and so forth, each corresponding to an individual partition ID. In each of these subtables, a parameter number 335A, available parameter values 335C, and a current parameter value 335D are indicated in correspondence with a selectable object management attribute item 335B.

Referring to FIG. 10, there are shown details of the parameter table 336 concerning extended functions of object management.

The extended function parameter table 336 comprises a plurality of subtables 336-1, 336-2, and so forth, each corresponding to an individual partition ID. In each of these subtables, a parameter number 336A, available parameter values 336C, and a current parameter value 336D are indicated in correspondence with a selectable extended function item 336B. In the example shown in FIG. 10, "designation of component program" (P21), "component program" (P22), and "timing of execution" (P23) are indicated as the selectable extended function items.

In the memory 200, the component programs 340 are provided as shown in FIG. 3, which can be selected using the parameter P22. If a component program desired by the user is not found in the parameter table 336 used for indicating selectable component programs, the user may add the desired component program into the memory 200 or the user may specify a method for acquiring the desired component program to the magnetic disk storage device. Thus, any desired function can be added to the object management program 350.

At the object management modification requester, the user selects proper values of the available parameters mentioned above. Thus, the parameters in the management table 330 can be set to meet a user's application program. According to current parameter values in the management table 330, the object management program 350 carries out data read-write operations and component-program-based data processing while selectively exchanging object organization, attributes and functionality of component programs 340. Thus, in the magnetic disk storage device 100, data management and data processing can be accomplished to meet user's requirements.

For instance, in a data read operation, data read out of the magnetic disk 101 is temporarily stored into the buffer memory 360. If execution of a special data processing based on any one of said component programs is designated on the read out data, the special data processing is carried out in the course of data reading from the magnetic disk 101 to the buffer memory 360 or after data reading from the magnetic disk 101 to the buffer memory 360. Then, the data subjected to the special data processing is transferred to the object management modification requester by the object management modification program 320.

By way of contrast, in a data write operation, data received from the object management modification requester is temporarily stored into the buffer memory 360 by the object management modification program 320. If execution of a special data processing based on any one of said component programs is designated on the data, the object management program 350 carries out the special data processing on the data while the data is held in the buffer memory 360 or in the course of data transfer from the buffer memory 360 to the magnetic disk 101.

Figure 11:
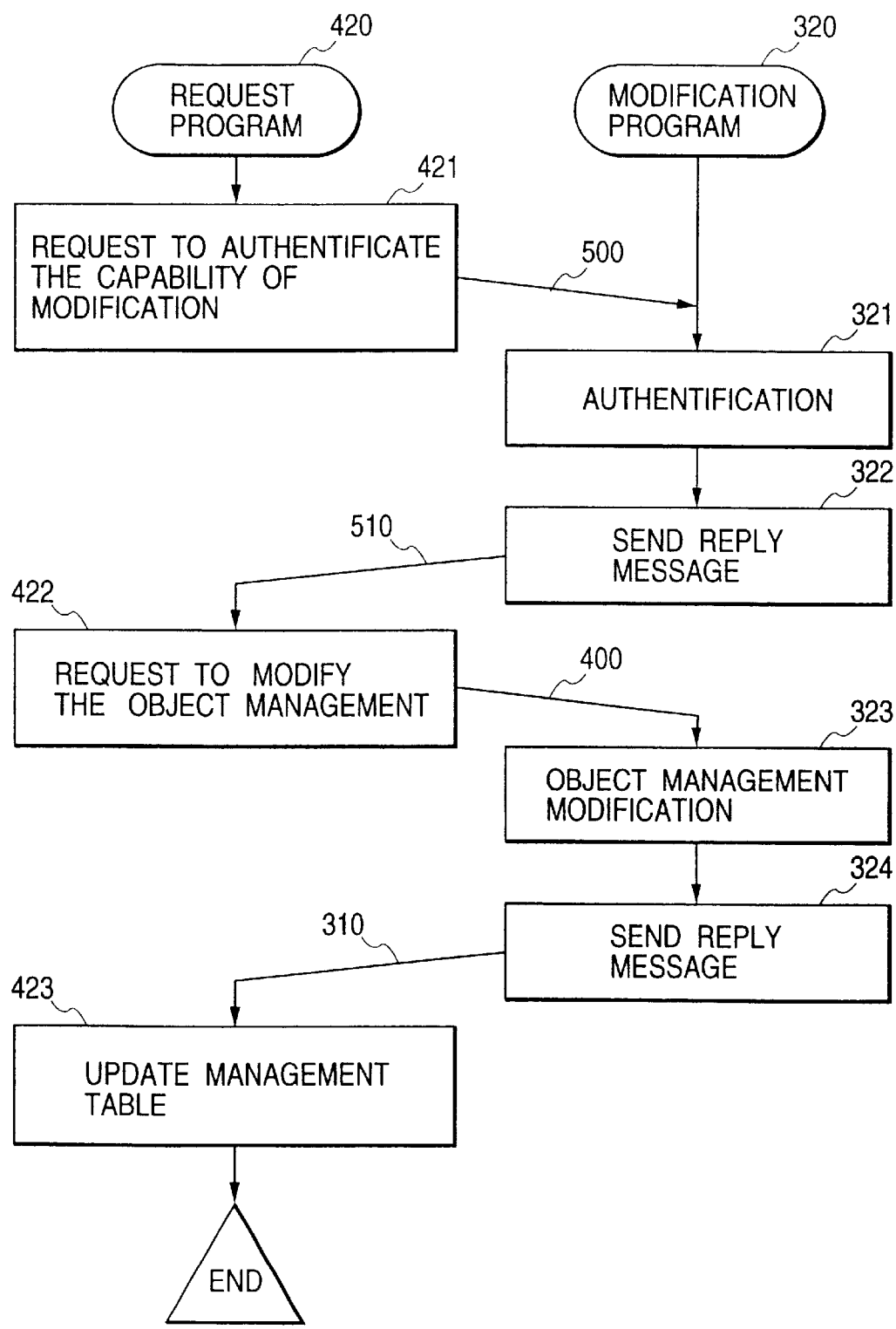
FIG. 11 is a diagram showing a procedure for communication between a request program 420 to be executed on the terminal device and a modification program 320 to be executed on the disk storage device.

Referring to FIG. 11, there is shown a time chart indicating main steps of the request program 420 for object management modification (hereinafter referred to simply as a request program) and the object management modification program 320 (hereinafter referred to simply as a modification program) in a process to modify the function of the object management program 350.

At the startup of the request program 420, if such data as current parameter values 430C have already been set in the management table 430, it is allowed to carry out step 422 for requesting object management modification. If data necessary for object management modification have not yet been set in the management table 430, the request program 420 sends a request 500 to authenticate the capability of object management modification to the modification program 320 (step 421). The above-noted authentication request 500, for example, contains identification information of the requester (user or source-of-request equipment) and information concerning the type of modification desired by the requester.

Upon receiving the authentication request 500, the modification program 320 carries out an authentication routine (step 321). In authentication of the capability of object management modification, a reference is made to the authentication table 370. In the authentication table 370, a condition of permission 370B is defined for each type of modification 370A. In execution of the authentication routine 321, it is judged whether the requester satisfies the condition of permission 370B or not. According to the result of judgment, a reply message 510 indicating either rejection or permission of object management modification is returned to the request program 420 (step 322). In the reply message indicating permission of object management modification, a part or the whole of the management table 330 is contained as reply data.

When the request program 420 receives the reply message indicating permission of object management modification, the request program 420 sets up the reply data in the management table 430. Then, when the requester specifies a parameter for object management modification with reference to the management table 430, a request message 400 for object management modification is generated and sent to the modification program 320 (step 422).

In response to the modification request message 400, the modification program 320 carries out an object management modification routine (step 323). Then, the modification program 320 returns a reply message 310 indicating the results of the updating of the management table 330 to the request program 420 (step 324). According to the results of the updating of the management table 330 which are shown in the results-of-processing field 413 of the reply message 310, the request program 420 updates the management table 430 (step 423). Then, the above-described program session comes to an end.

Figure 12:
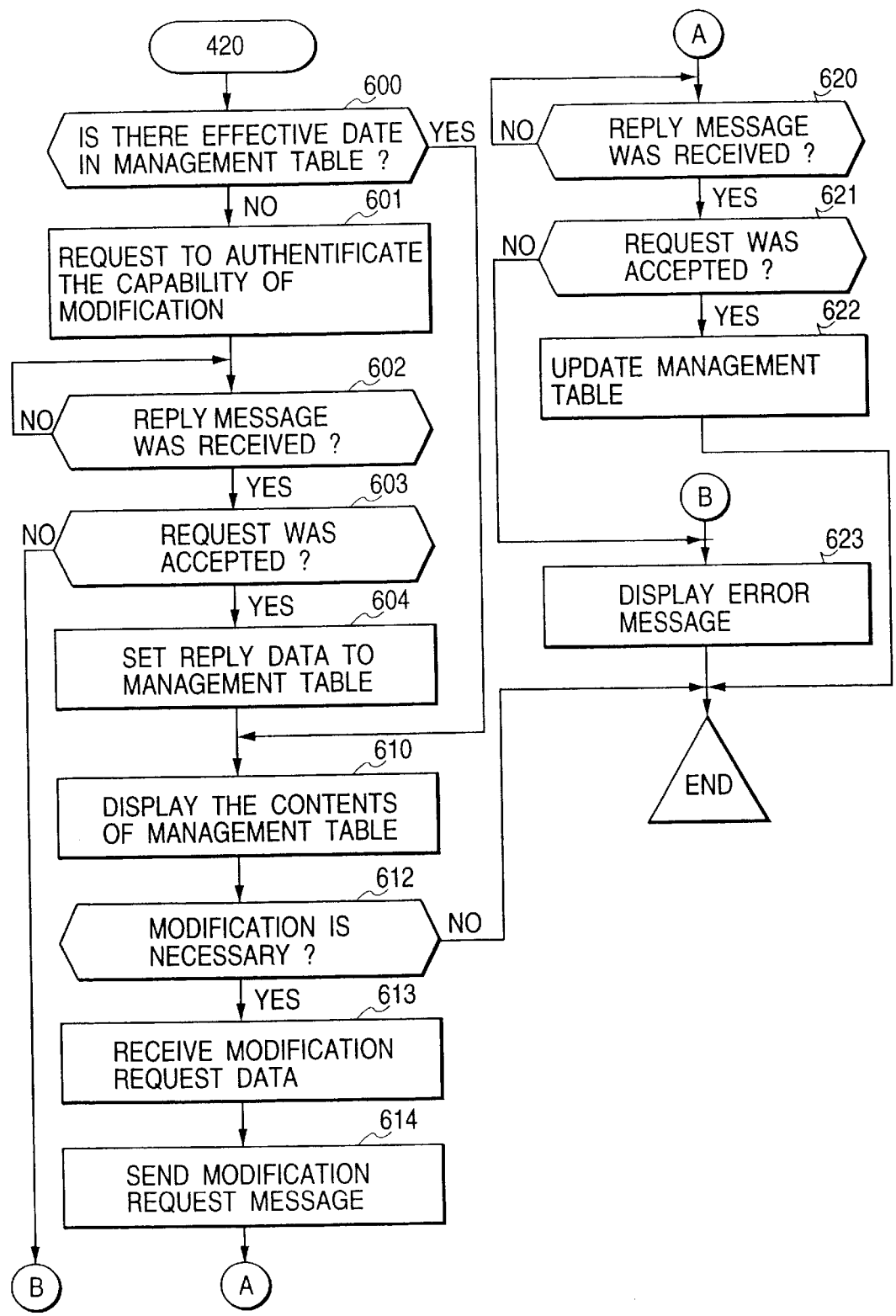
FIG. 12 is a flowchart showing the request program 420 to be executed on the terminal device.

Referring to FIG. 12, there is shown a detailed flowchart of the request program 420.

In execution of the request program 420, it is checked whether or not effective data is contained in the management table 430 (step 600). If the management table 430 contains effective data, step 610 is then carried out. Alternatively, if the management table 430 contains no effective data, a message 500 indicating the request to authenticate the capability of object management modification is generated and sent to the modification program 320 (step 601). Thereafter, the request program 420 waits for arrival of the reply message 510 (step 602). Upon receipt of the reply message 510, its contents are checked (step 603). If the reply message 510 indicates rejection of object management modification, an error message is displayed (step 623) and execution of the request program 420 comes to an end. If the reply message 510 indicates permission of objet management modification, the reply data contained therein is set up in the management table 430 (step 604), and the contents of the management table 430 are displayed (step 610).

A judgment on user input is then made (step 612). If the user has specified that object management modification is not necessary, execution of the request program 420 comes to an end. Alternatively, if the user has specified that object management modification is necessary, an interface screen for generating a modification request message 400 is displayed and the request program 420 receives modification request data therethrough (step 613). Upon completion of modification request data setting, the request program 420 sends the modification request message 400 to the modification program 320 (step 614) and then waits for arrival of the reply message 310 (step 620). In judgment on the contents of the reply message 310 (step 621), if it is found that the request has been accepted, the management table 430 is updated according to the reply message (step 622). Then, execution of the request program 420 comes to an end. If it is found that the request has been rejected, an error message is displayed (step 623).

Figure 13:
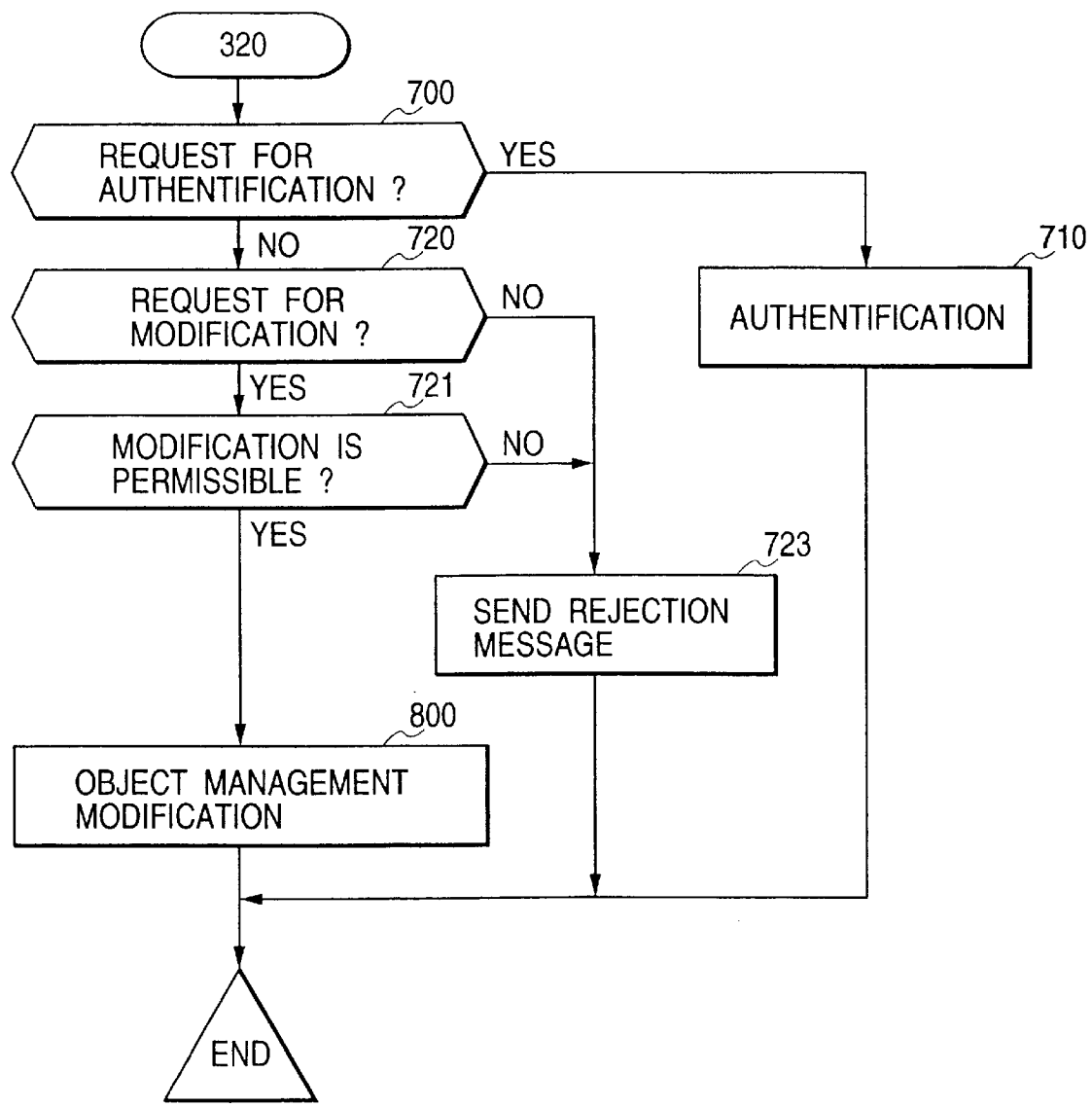
FIG. 13 is a flowchart showing the modification program 320 to be executed on the disk storage device.

Referring to FIG. 13, there is shown a detailed flowchart of the modification program 320.

If the modification program 320 receives the authentication request message 500 (step 700), control is passed to an authentication routine 710 to be described below with particular reference to FIG. 14. If a message received by the modification program 320 is neither the authentication request message 500 nor the object management modification request message 400 (step 720), a rejection message is returned (step 723) and then execution of the modification program 320 comes to an end. In a case where the object management modification request message 400 is received, it is judged whether the requested modification is permissible or not (step 721). Unless it is permissible, a rejection message is returned (step 723). If it is permissible, control is passed to an object management modification routine 800 to be described below with particular reference with FIG. 15.

Figure 14:
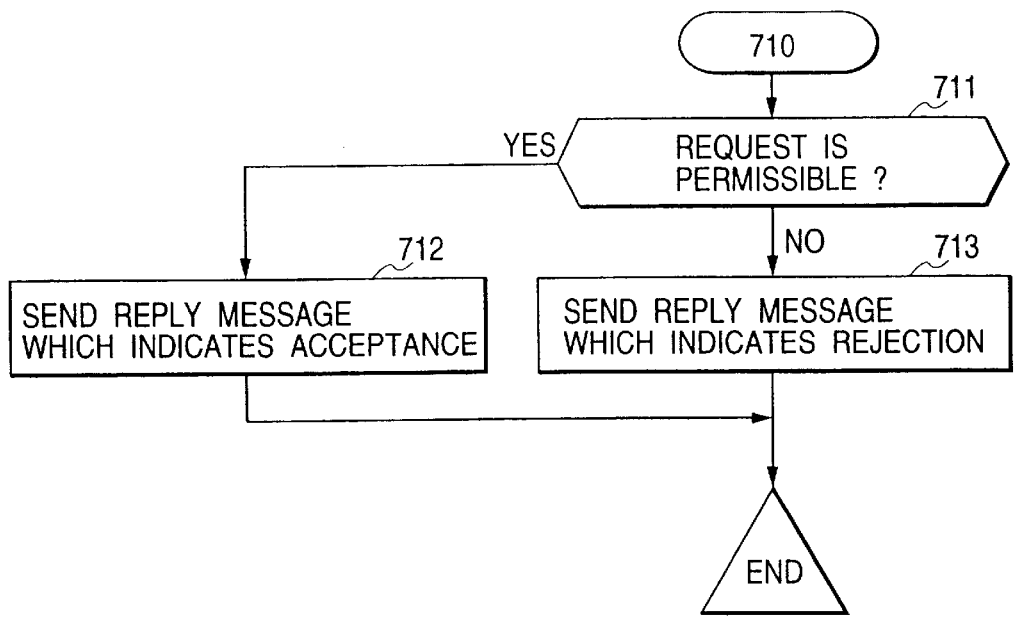
FIG. 14 is a flowchart showing details of authentication step 710 in the modification program 320.

Referring to FIG. 14, there is shown a detailed flowchart of the authentication routine 710.

In execution of the authentication routine 710, the authentication table 370 is referenced according to the type of modification indicated by the authentication request message 500, and it is judged whether or not requester identification information indicated by the authentication request message 500 meets the condition of permission 370B. If the condition of permission 370B is met, the authentication routine 710 returns a reply message which indicates acceptance of the request, including the contents of the management table 330 (step 712). Otherwise, a reply message indicating ejection of the request is returned (step 713).

Figure 15:
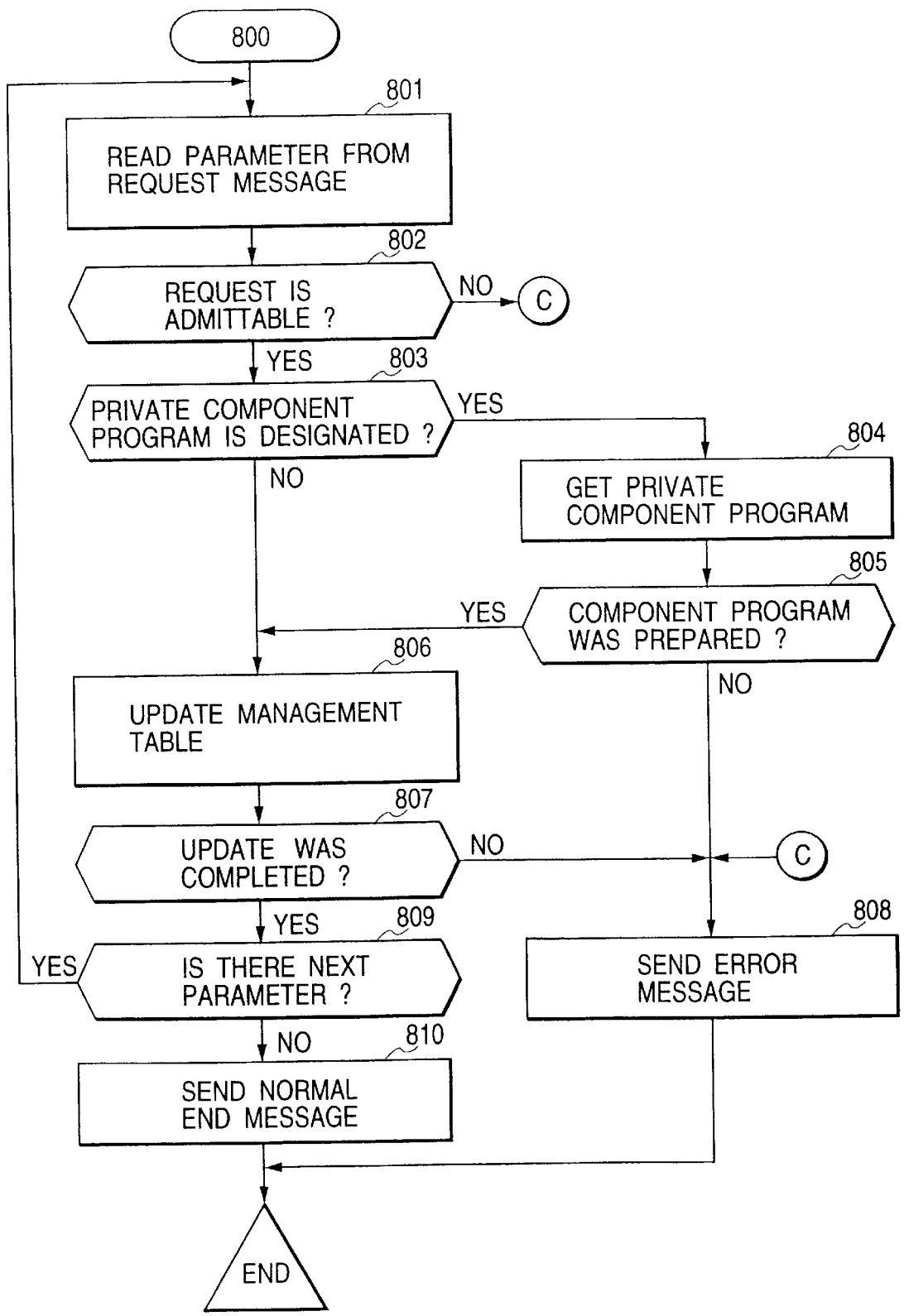
FIG. 15 is a flowchart showing details of object management modification step 800 in the modification program 320.

Referring to FIG. 15, there is shown a detailed flowchart of the object management modification routine 800.

In execution of the object management modification routine 800, parameter values specified by the requester are read out successively from parameter field 404 of the request message 300 which is equivalent to the request message 400 (step 801). Then, the specified parameter values are checked (step 802). If any specified parameter value is not permissible, an error message is returned (step 808). If the specified parameter values are permissible, it is judged whether a user's private component program is specified or not (step 803). If any user's private component program is specified, it is then acquired(step 804). In case that the specified user's private component program cannot be prepared on the memory 200 for use by the object management program 350 (step 805), an error message is returned (step 808).

If no user's private component program is specified or if the specified user's private component program is prepared on the memory 200, the management table 350 is updated according to the first one of the specified parameter values (step 806). In case that the updating of the management table 350 fails (step 807), an error message is returned (step 808). After the management table 350 is updated, it is checked whether there is the next parameter value to be processed in the request message (step 809). If the next parameter value is found, step 801 is taken again to repeat the sequence mentioned above. When all the specified parameter values have been processed, a normal end message is returned (step 810) and then execution of the object management modification routine 800 is terminated. Note that the normal end message contains management table data updated through the modification processing described above.

Figure 16:
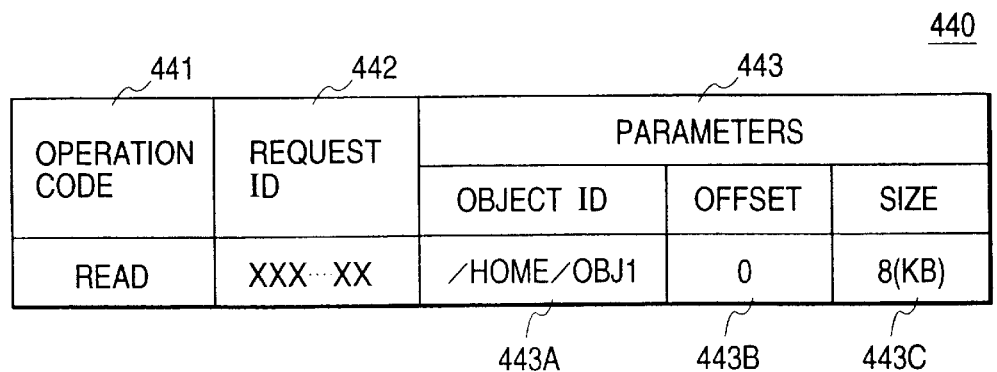
FIG. 16 is a diagram showing a format for a control command 440 to be sent from the terminal device to the disk storage device.

Referring to FIG. 16, there is shown a format for an object I/O command 440, which is a typical example of a file control command used in execution of the object management program 350.

The object I/O command 440 comprises an operation code field 441 for indicating the kind of command, a request ID field 442, and a parameter field 443. In the parameter field 443, there are provided an object ID item 443A for indicating an object to be accessed for reading/writing, an offset item 443B for indicating an offset value from the top address of the object, and a data size item 443C. In the format of the WRITE command, a data field for holding data to be written is provided after the parameter field 443.

Figure 17:
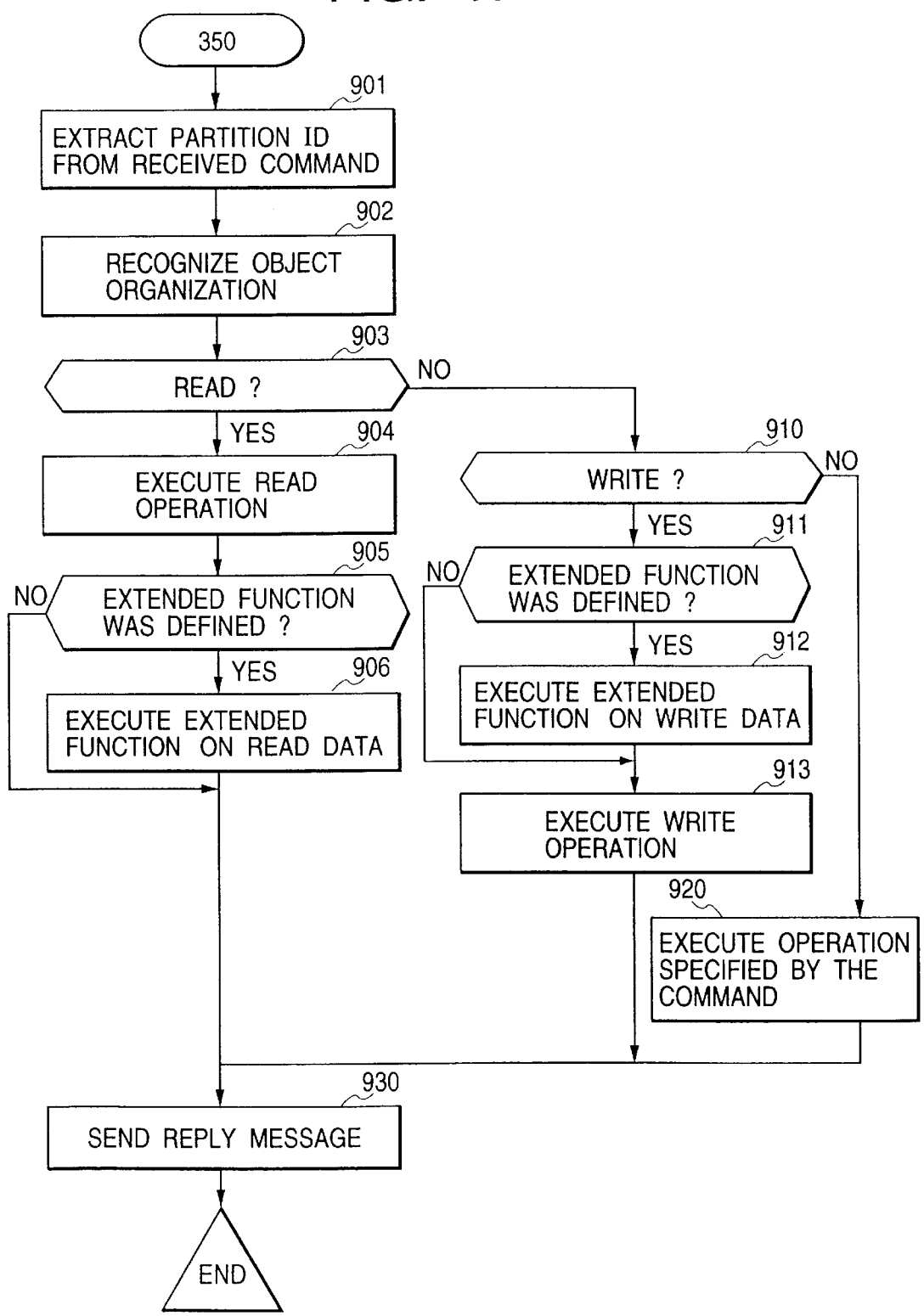
FIG. 17 is a flowchart showing an object management program 350 to be executed on the disk storage device in response to the control command 440.

Referring to FIG. 17, there is shown a detailed flowchart of the object management program 350.

In execution of the object management program 350, a partition ID code is extracted from the object ID item 443A of a received object I/O command 440 (step 901). The object ID item 443A contains a string of names in a hierarchical structure format with slant (/) characters for delimitation. Where the object ID item 443A contains "/HOME/OBJ1" as shown in FIG. 16, the first name "/HOME" indicates a partition ID code. Using the partition ID code extracted at step 901, a reference is made to the object organization table 334, shown in FIG. 8, which is a part of the management table 330. Thus, object organization in a partition indicated by the partition ID code is recognized (step 902). In the example shown in FIG. 8, object organization (file organization) in the partition indicated by "/HOME" is arranged in a tree structure method.

Then, a judgment is formed on an operation code indicated in the operation code field 441 of the object I/O command 440.

In a situation where the object I/O command 440 is a "READ" command ("YES" at step 903), data is read out of the magnetic disk 101 through the disk controller 102 according to parameter values specified in the parameter field 443 of the object I/O command 440 (step 904). At this step, a reference is made to the object management table 355 which defines a correspondence relationship between object ID codes and physical addresses on the magnetic disk 101. Through this operation, the object ID code 443A of the object I/O command 440 is converted into a physical address on the magnetic disk 101, thus providing a "READ" command that is acceptable by the disk controller 102. Note that, in the object management table 355, the correspondence relationship between object ID codes and on-disk physical addresses varies depending on the file organization method of each object.

In the above-stated step 904, a reference is also made to the subtable 335-1 concerning object management attribute parameters shown in FIG. 9 according to the partition ID code. Thus, for each object, a read operation is carried out based on a specified object management attribute.

Then, a reference is made to the parameter table 336 concerning extended functions of object management shown in FIG. 10 according to the partition ID code. If an extended function (component program) is indicated in the extended function parameter table 336 (step 905), data read out onto the buffer memory 360 is processed using the extended function (component program) (step 906). Then, the resultant data of this processing is sent to the requester by a reply message (step 930).

In a situation where the object I/O command 440 is a "WRITE" command ("YES" at step 910), a reference is made to the parameter table 336 concerning extended functions of object management. If an extended function (component program) is indicated in the extended function parameter table 336 ("YES" at step 911), data held in the buffer memory 360 is processed using the extended function (component program) (step 912). Then, the resultant object data of this processing is written onto the magnetic disk 101 through the disk controller 102 (step 913). At this step, a reference is made to the object management table 355 and the subtable 335-1 concerning object management attribute parameters as in the case of execution of the "READ" command. Thus, based on a specified object management attribute, a data write operation is carried out at physical addresses corresponding to the object ID code.

In a situation where the file control command "OPEN", "CLOSE", "DELETE" or "CREATE" is given instead of the "READ" or "WRITE" command ("NO" at step 910), an operation specified by each command is carried out (step 920).

Referring to FIG. 3, the following considers a situation where data read out onto the buffer memory 360 from the magnetic disk medium 101 is transferred to the requester intactly: In a conventional magnetic disk storage device, a data block read out onto the buffer memory 360 is converted into a data block form that can be transferred through the network. It is therefore necessary to perform additional processing for copying data from the buffer memory 360 to a second buffer area.

In such data transfer, according to the disk storage device of the present invention, a destination address of data transfer, data size and other transfer parameters are prespecified as object management attribute parameters 335, thereby making it possible to transfer read-out data to the requester readily without the need to perform the above-mentioned copying operation.

The object management modification request program 420 can be installed on the requester 130 manually. Further, for example, the object management modification request program 420 may be downloaded from the magnetic disk storage device 100 to the requester 130 using a network access program such as a WEB browser.

The requester 130 on which the object management modification request program 420 is run may also be the magnetic disk storage device 100 on which the object management modification program 320 is run. That is to say, both the object management modification program 320 and the object management modification request program 420 may be run on the magnetic disk storage device 100. In the modified arrangement mentioned above, user data input from a remote terminal computer is supplied to the object management modification request program 420 running on the magnetic disk storage device 100 through the use of a network access program such as a WEB browser. In this case, as a requester ID code, any predetermined value is assigned instead of a combination of an IP address and a port number.

While the present invention has been described in detail with respect to specific embodiments in the magnetic disk storage device, it is to be understood that the invention is also applicable to a disk storage device using any kind of storage medium other than the magnetic disk, such as a photomagnetic disk, optical disk and DVD.

What is claimed is:

1. A disk storage device, comprising:
a disk storage medium;
a disk controller for accessing said disk storage medium to read/write data thereon;
an interface for connecting said disk controller to a network;
object management means for converting a control command containing an object identifier received through said interface into a control command containing physical address information of said disk storage medium and for feeding the thus converted control command to said disk controller; and
object management modification means for modifying a function of said object management means in response to a modification request message received through said interface;
a management table which defines file organization for each partition defined in said disk storage medium;
wherein said object management modification means modifies the file organization defined in said management table in response to said modification request message, and said object management means manages data stored on said disk storage medium according to the file organization defined in said management table.

2. A disk storage device according to claim 1, wherein
said management table defines data management attributes in correspondence with each partition arranged on said disk storage medium,
said object management modification means modifies the data management attributes defined in said management table in response to said modification request message, and
said object management means controls data reading from said disk storage medium and data writing thereto according to the data management attributes defined in said management table.

3. A disk storage device according to claim 1, wherein
said management table contains definitions of data processing to be executed in correspondence with each partition defined in said disk storage medium,
said object management modification means modifies the data processing definitions in said management table in response to said modification request message, and
said object management means carries out data processing on at least either of data read out of said disk storage medium and data to be written onto said disk storage medium according to the data processing definitions in said management table.

4. A disk storage device according to claim 3, further comprising:
component programs corresponding to data processing defined in said management table;
wherein said object management means carries out said data processing with use of said component programs according to the definitions in said management table.

5. A disk storage device according to claim 1, wherein
said modification request message contains at least one of parameters concerning file organization, data management attributes and data processing in correspondence with each partition identifier, and
said object management modification means modifies at least one of functions concerning file organization, data management attributes and data processing, which are provided in said object management means, according to each parameter contained in said modification request message.

6. A disk storage device comprising:
a disk storage medium;
a network interface;
a disk controller for accessing said disk storage medium to read/write data thereon;
an interface for connecting said disk controller to a network;
object management means for converting a control command containing an object identifier received through said interface into a control command containing physical address information of said disk storage medium and for feeding the thus converted control command to said disk controller; and
object management modification means for modifying a function of said object management means in response to a modification request message received through said interface;
a management table which defines file organization for each partition defined in said disk storage medium;
wherein said object management modification means modifies the file organization defined in said management table in response to said modification request message, and said object management means manages data stored on said disk storage medium according to the file organization defined in said management table;

a disk controller having an object management function for converting a high-level read/write command, which is received through said network interface and containing an object identifier specifying an access target, into a low-level read/write command containing physical address information of said disk storage medium to access to said disk storage medium; and object management modification means for modifying said object management function in response to a modification request message received through said network interface.

7. A disk storage device according to claim 6, wherein said management table defines data management attributes in correspondence with each partition arranged on said disk storage medium, said object management modification means modifies the data management attributes defined in said management table in response to said modification request message, and said object management means controls data reading from said disk storage medium and data writing thereto according to the data management attributes defined in said management table.

8. A disk storage device according to claim 6, wherein said management table contains definitions of data processing to be executed in correspondence with each partition defined in said disk storage medium, said object management modification means modifies the data processing definitions in said management table in response to said modification request message, and said object management means carries out data processing on at least either of data read out of said disk storage medium and data to be written onto said disk storage medium according to the data processing definitions in said management table.

9. A disk storage device according to claim 8, further comprising:

component programs corresponding to data processing defined in said management table;

wherein said object management means carries out said data processing with use of said component programs according to the definitions in said management table.

10. A disk storage device according to claim 6, wherein said modification request message contains at least one of parameters concerning file organization, data management attributes and data processing in correspondence with each partition identifier, and said object management modification means modifies at least one of functions concerning file organization, data management attributes and data processing, which are provided in said object management means, according to each parameter contained in said modification request message.

\* \* \* \* \*